Oct. 23, 1962 V. GOLDTHWAITE ET AL 3,060,376
MACHINES FOR TESTING AND SORTING FERROMAGNETIC CORES
Filed Aug. 13, 1959 6 Sheets-Sheet 1

INVENTOR.
Val Goldthwaite &
Kurt Schlacht
BY
ATTORNEYS

Oct. 23, 1962 V. GOLDTHWAITE ET AL 3,060,376
MACHINES FOR TESTING AND SORTING FERROMAGNETIC CORES
Filed Aug. 13, 1959 6 Sheets-Sheet 2
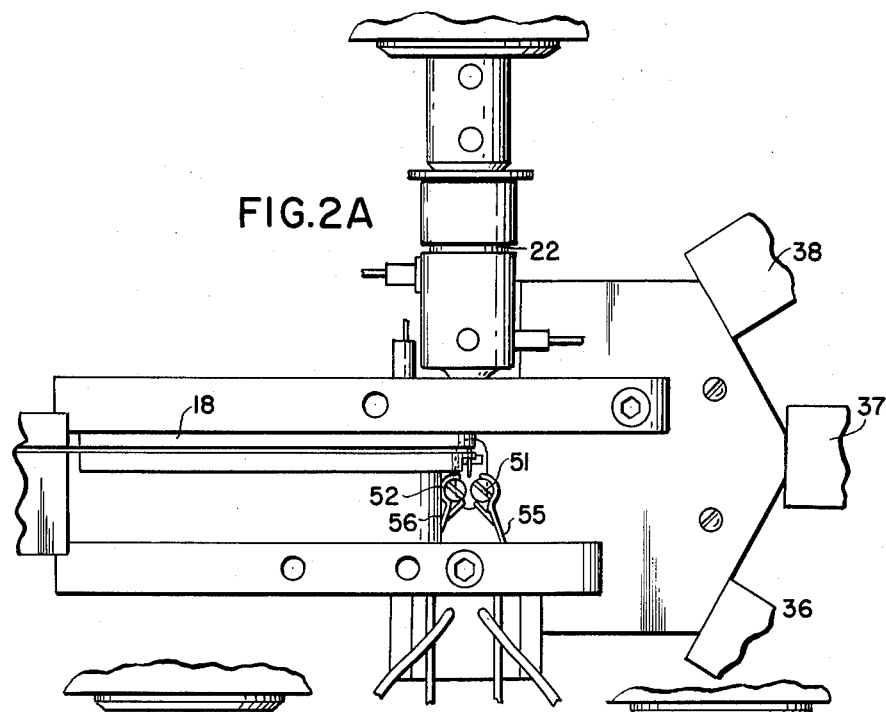
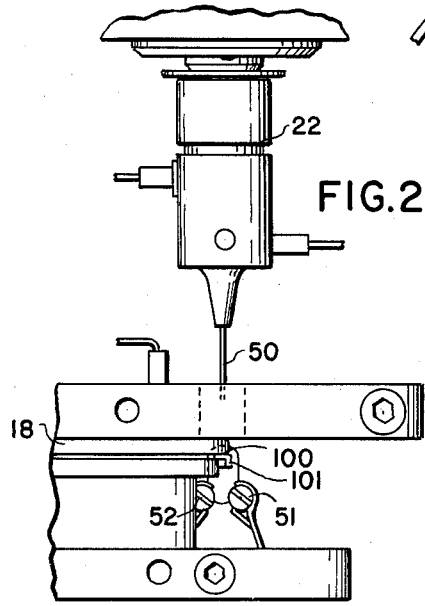
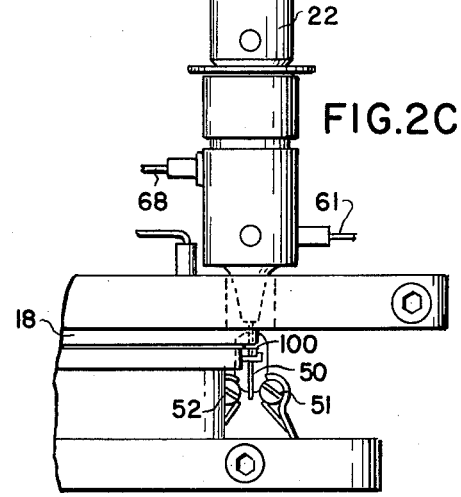
INVENTOR.
Val Goldthwaite &
BY Kurt Schlacht
ATTORNEYS

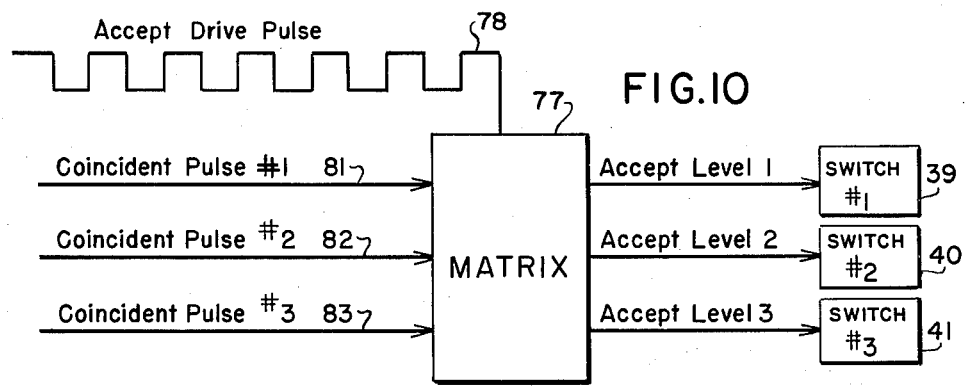
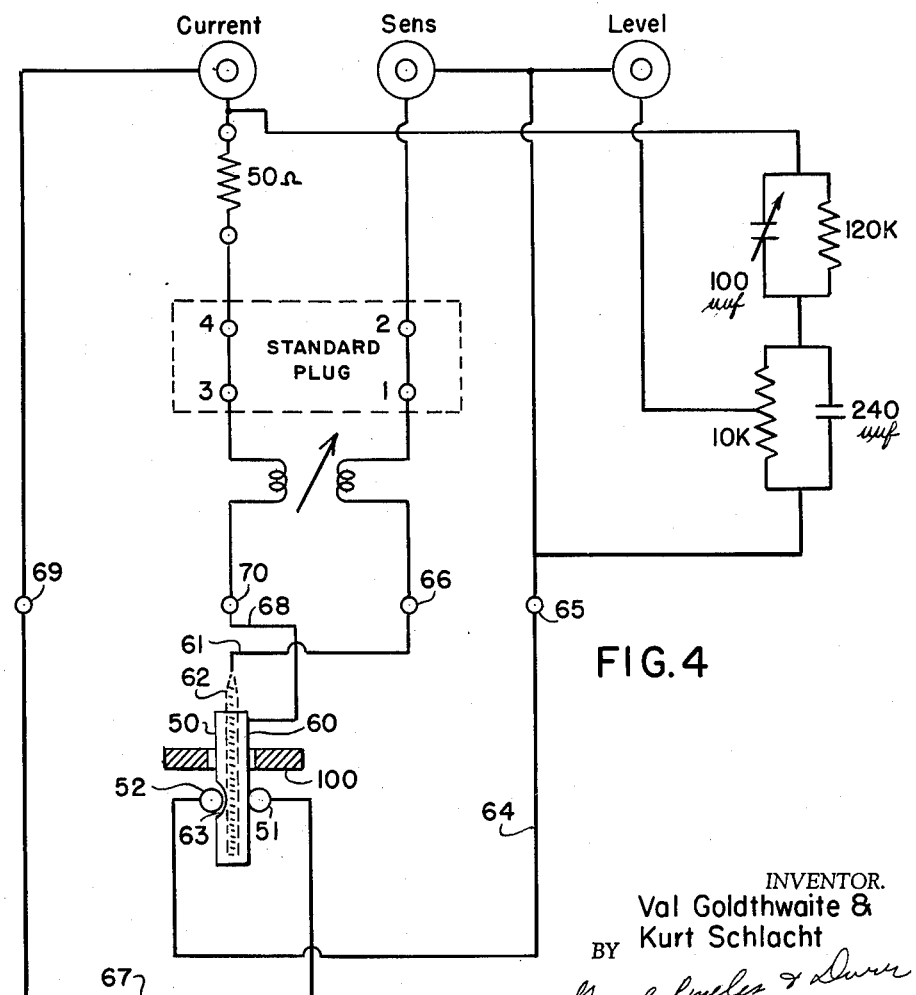

Oct. 23, 1962 V. GOLDTHWAITE ET AL 3,060,376
MACHINES FOR TESTING AND SORTING FERROMAGNETIC CORES
Filed Aug. 13, 1959 6 Sheets-Sheet 5

INVENTOR.
Val Goldthwaite &
BY Kurt Schlacht

ATTORNEYS

United States Patent Office 3,060,376
Patented Oct. 23, 1962

3,060,376
MACHINES FOR TESTING AND SORTING
FERROMAGNETIC CORES
Val Goldthwaite, Providence, and Kurt Schlacht, Cliffwood Beach, N.J., assignors, by mesne assignments, to Indiana General Corporation, a corporation of Indiana
Filed Aug. 13, 1959, Ser. No. 833,605
15 Claims. (Cl. 324—34)

This invention relates to improvements in devices for testing ferromagnetic core bodies.

Ferromagnetic toroidal core bodies especially those formed of ferromagnetic materials which have a square hysteresis loop must be tested and sorted to make sure that the many cores to be formed into a memory matrix, for example, have substantially uniform properties. Machines have been developed for testing these properties and such machines are almost indispensable since the cores to be tested are usually only a few thousandths of an inch in diameter and since a very large number of such cores are required. Typical cores being tested now, for example, have an outside diameter of .050", an inside diameter of .030" and a thickness of .015" although still smaller cores are contemplated. The machines developed heretofore for testing the cores, test about one or two cores per second, for example.

Among the objects of this invention is to provide a machine capable of testing such cores at a faster rate, for example, about 12 per second.

Among other objects of the invention is to provide a machine which in spite of operating at a high rate of speed is so constructed as to avoid any unusual frictional wear of the moving parts.

Other objects will be clear from the detailed description below.

The objects of the invention are obtained by mounting a current carrying probe on a reciprocating carrier adapted to be reciprocated at a high rate of speed and at the same time be exactly centered by means of a gas bearing, providing means whereby by a set of cylindrical contacts controlled by the movement of the probe carrier close and open to grasp and release the current carrying probe at the proper instant to prevent frictional wear on the conductors, providing a new type of current carrying probe for the device, a gravity feed for the cores to be tested, a plurality of suction channels to sort the core immediately after testing and in accordance with its response to the test, and providing various additional auxiliary means to assure the reliability of the device.

In the drawings,

FIG. 2A is a detail view showing the probe in position for testing a core.

FIGS. 2B and 2C are detail views similiar to FIG. 2A but showing the probe in other positions.

FIG. 4 is a detail view greatly enlarged of the probe itself together as a schematic showing the sense box circuit.

FIG. 10 is a block diagram of the core sorting mechanism.

*The Relationship of the Units of the Apparatus*

Figure 1:
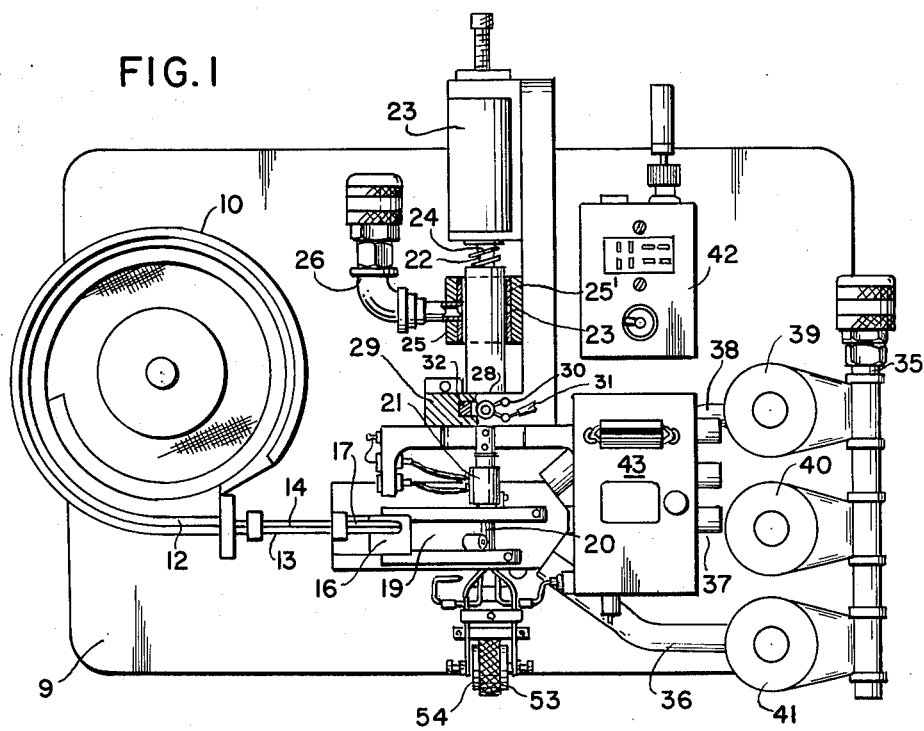
FIG. 1 is a top plan view of the device.
Figure 1A:
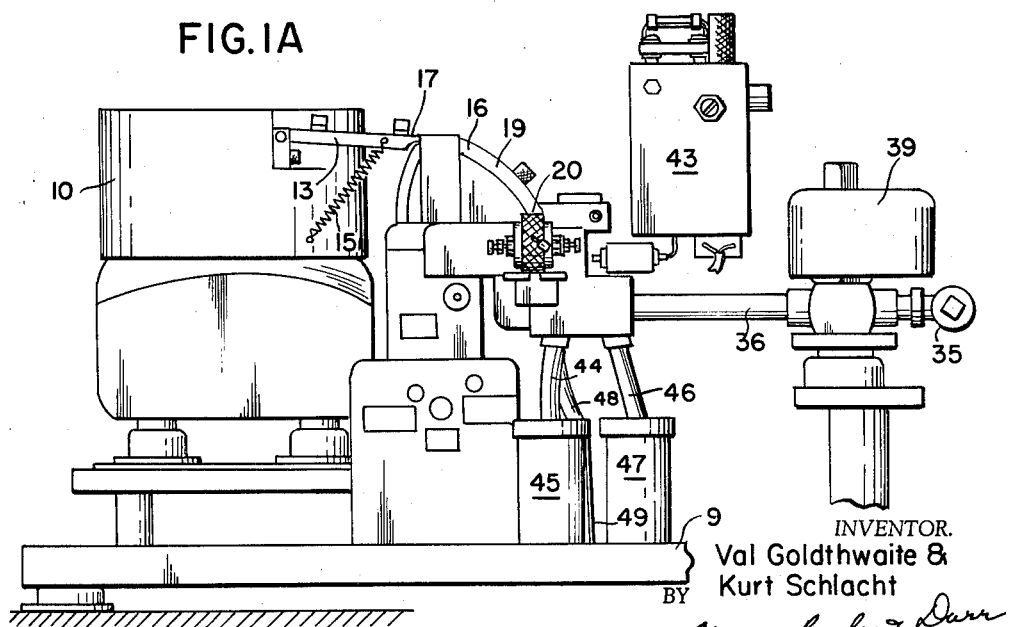
FIG. 1A is a front view of the device of FIG. 1.

As shown in FIGS. 1 and 1A, substantially the entire apparatus is mounted on a base 9 and comprises a core feeding unit 10 which is not a part of the present invention but comprises a known vibrator type of feed device such as sold under the name of "Syntron" in which cores held in the center of the bowl 11 are aligned and fed by vibratory action around the rim 12 thereof. A bridge device 13, containing a groove 14 for feeding the toroidal cores which roll peripherally one after the other in said groove 14, connects the feeding unit 10 to the feed device 16. Cores are kept in the groove by cover 13 (FIG. 1A). The bridge device 13 is attached to the vibrator 10 and vibrates therewith. The bridge 13 prevents the vibration of the device 10 from being transmitted to the feed device 16 of the core tester since bridge 13 slides on tongue 17 at the end thereof which is integral with the tester feed device 16, the bridge 13 being held against the latter by spring 15.

The tester feed device 18 is of arcuate shape and contains the same type of narrow groove for feeding the cores and maintaining them in alignment. This arcuately shaped feed device has a cover 19 fitted over the same to hold the cores in the groove. The grooved portion 18 is shown in FIGS. 2A–2C.

The cores are tested in the area 20 (FIGS. 2A and 2C) which is adjacent the lower end of arcuate core feed device 16 but the cores are not shown in FIGS. 1 and 2A. In this area 20, however, a probe is automatically fed through the opening in the toroidal core by the probe holder 21. The probe holder 21 comprises a longitudinal shaft 22 which is reciprocated axially. The shaft 22 is moved in one direction by a solenoid magnet device 23 and in the opposite direction by spring 24, for example. In the position shown in FIG. 1, the shaft 22 and probe (not shown) is in position for testing a core, i.e., the lowermost position with respect to FIG. 1.

This probe carrier shaft 22 is centered and supported by means of the air bearing device 25. In this device air is fed into the space between the probe and a lining 25' in the bearing 25 by pipe connection 26; the air passes around the shaft 22, which is made of hollow aluminum or any other light weight or corrosive resistant material such as plastics, in the annular channel 27 and escapes from the ends of the bearing 25. As an example of satisfactory operation, air is fed into the bearing at 15–20 p.s.i. passes between a length of the order of 1" of the bearing and probe shaft (which weighs in the order of 15 g.) and escapes therefrom at a rate of about 4 cubic feet per minute. The pressure of the air required depends on the weight of the probe carrier, the size of the surrounding bearing structure 25, etc., and can vary within fairly wide limits. The bearing 25 includes a plastic lining 25' which may be of nylon, for example. The spacing between lining 25' and shaft 22 should be held to a fairly close tolerance, for example, .0005". The probe carrier shaft 22 and probe are therefore very accurately centered and the carrier can be moved back and forth substantially without friction since it is entirely supported by gas.

The shaft 22 includes a steel shouldered portion 28 which cooperates with stop means 29 to limit the movement of the shaft in one direction. Interiorly of 29 a magnetic coil 32 is provided which can be energized by means of connectors 30, 31. To prevent the shaft 22 from bouncing due to its fast movement and sudden stopping, the magnet coil 32 is energized just prior to the time the shoulder 28 reaches stop 29. This not only prevents the shaft from bouncing but it increases the dwell time during which a core is being tested.

Also shown in FIGS. 1 and 1A is the vacuum line 35 connectable to any one or none of three tubes 36, 37 and 38 by means of valves (not shown) each operated by one of the three vacuum switches 39, 40 and 41, respectively. As shown in FIGS. 1 and 1A a core moved by a vacuum applied to tube 36 drops through tube 44 into container 45; similarly, a core moved by a vacuum applied to tube 37 drops through tube 46 into container 47 and a core moved by a vacuum applied through tube 38 moves through tube 48 into container 49. A fourth container (not shown) is provided to collect reject cores which are not reactive enough to activate any of vacuum switches 39, 40 or 41. The containers 45, 47 and 49 have covers thereon to obtain the proper vacuum seal.

The electrical circuits are contained within boxes 42 and 43.

*The Probe Carrier, Probe and Probe-Contact Movements*

FIG. 2B shows the probe 50 and probe holder 21 in its most remote distance from a core 100 which is to be tested. In this figure the core 100 is held in place for testing by shuttle 101 and by a portion of cover 16 which has been moved in FIGS. 2A, 2B and 2C. As the shaft 22 moves into position with the probe 50 extending through the opening in core 100, the contacts 51 and 52 remain spaced until the shaft 22 has moved to its innermost position. FIG. 2C shows when the shaft 22 and probe 50 has reached its innermost position just before the contacts 51 and 52 converge on the probe 50 and make contact as shown in FIG. 4. Before the shaft 22 starts its return movement the contacts 51 and 52 are again opened so that the probe is neither required to push the contacts 51 and 52 apart nor to disengage itself from said contacts.

The movement of the contacts 51 and 52 is controlled by the poles 53, 54 of an electromagnet. The contacts 51, 52 are normally held in closed position by spring arms 55, 56. At proper times electrical pulses activate the electromagnet which in turn attract the end of levers 57, 58 to spread the arms 55, 56 and open the contacts 51, 52 to allow the probe 50 to enter or withdraw.

*The Dual Probe*

The dual probe 50 has a hollow outer jacket 60 which may be constructed from a hypodermic needle and has been enlarged in FIG. 4 to show its structure more clearly. Within the outer metal tube 60 a conductor element 61 is provided. The conductor element is coated with a layer 62 of insulating material so that there is no electrical contact between said conductor and the tube 60. The tube 60 has a side orifice 63 in one side thereof and within this opening 63 the bare surface of conductor 61 is exposed to make contact with 52.

When the contacts 51 and 52 are closed on probe 50 as shown, two independent circuits through the core 100 are closed. One circuit includes conductor 61, contact 52 and line 64 which connect to the contacts 65, 66 of the sensing circuit. The tube 60, contact 51 and lines 67 and 68 connect to the contacts 69, 70 of the driving pulse circuit. The advantages of dual probes for core testers where the driving circuit and the response circuit are independent are known. The probe 50 of the present invention, however, has a distinct advantage over the conventional type of split probe since it is not injured if it is forced against a misplaced core.

The circuit of the sense box as shown in FIG. 4 is of conventional type.

Figure 3A:
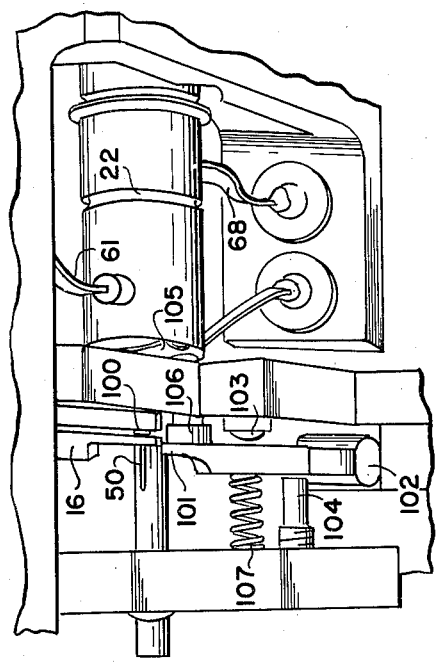
FIGS. 3A and 3B are detail perspective views showing the operation of the means for positioning in succession, the cores to be tested.
Figure 3B:
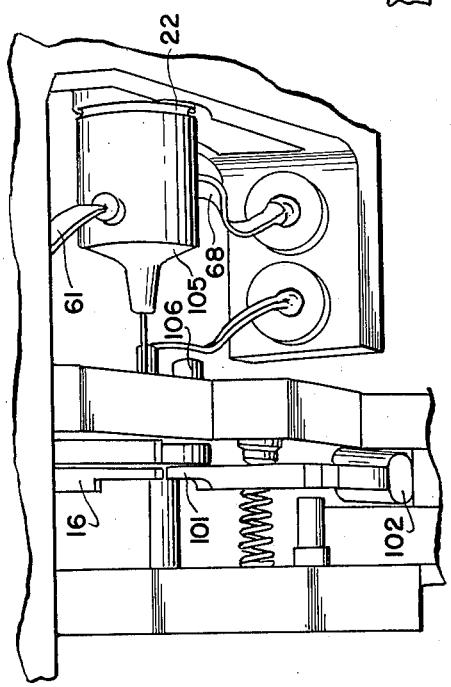
Figure 7:
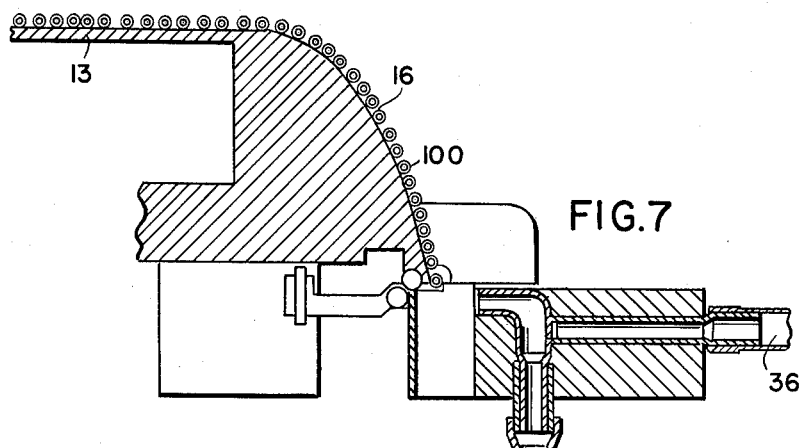
FIG. 7 is a side cross sectional view of the feeding and shorting device for the cores.
Figure 5:
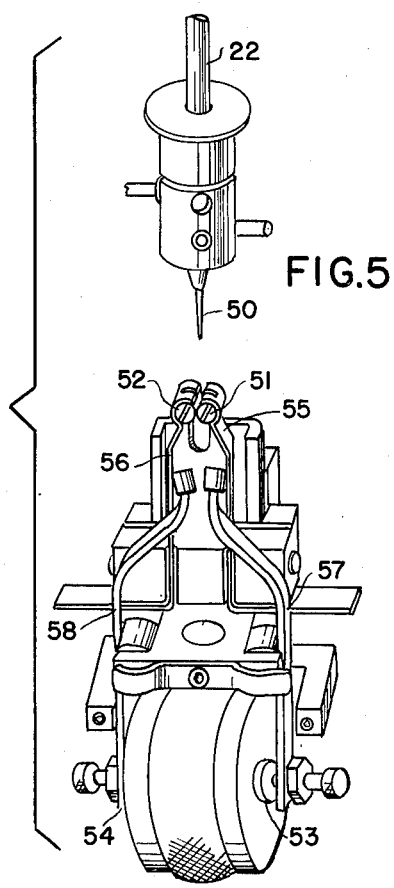
FIG. 5 is a detail view of the probe and its contents removed from the remainder of the apparatus.
Figure 6:
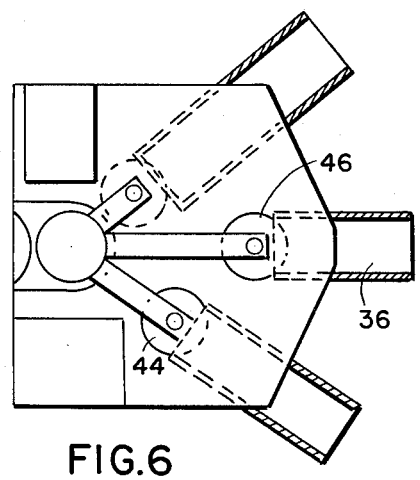
FIG. 6 is a detail view of the vacuum sorting manifold.

FIGS. 3A and 3B illustrate (bottom view) how the cores are successively positioned for testing. As a core moves downward by gravity it is stopped by the shuttle 101. This shuttle 101 is pivotally mounted at 102 for movement between stops 103 and 104. A second core 100 which rests on top of first core is in position to receive probe 50. As the shaft 22 moves into its extreme position in which the probe 50 extends through the second core 100, the front portion 105 of probe holder 21 pushes shaft 106 which in turn pushes the shuttle 101 from contact with stop 103 to contact with stop 104 and out of the way of the first core 100 as shown in FIG. 3A so that the second core 100 is supported on probe 50. When the carrier shaft 22 moves away from the core 100, spring 107 pushes the shuttle 101 and shaft 106 back to its original position shown in FIG. 3B. In moving back to its original position, the shuttle 101 catches the next core coming from feed device 16.

*Logic and Timing of Automatic Three Level Toroid Handler*

For trouble free operation of said handler, it is important that the probe 50, the electromagnetic damper 32, the contacts 51, 52 and vacuum switch currents are turned on and off at proper time.

Timing is as follows:

The current 80 (see FIG. 9) that drives the probe solenoid magnet 23 is delivered by a power transistor (not shown) which is turned on for a duration of about 32 milliseconds (for example when testing 12 cores per second). Critical damping of the probe solenoid assures quick action of the probe armature.

The electrical contacts 51, 52 are actuated by the same current pulse 80. Due to the difference in current requirements and the mechanical operational differences of the contacts 51, 52 and the probe armature 22, the contacts will be open, before the probe carrier 21 can start its travel. When the probe holder 21 or armature 22 nears its most distant position and before the probe current is cut off, a timing circuit 71 supplies a bridging current directly into the contacts 51, 52 and damping magnet 32 which stays on after the probe current 80 has stopped flowing. This bridging current is then shut off when the probe is home, allowing the contacts 51, 52 to close and de-energizing the damping magnet 32.

Figure 8:
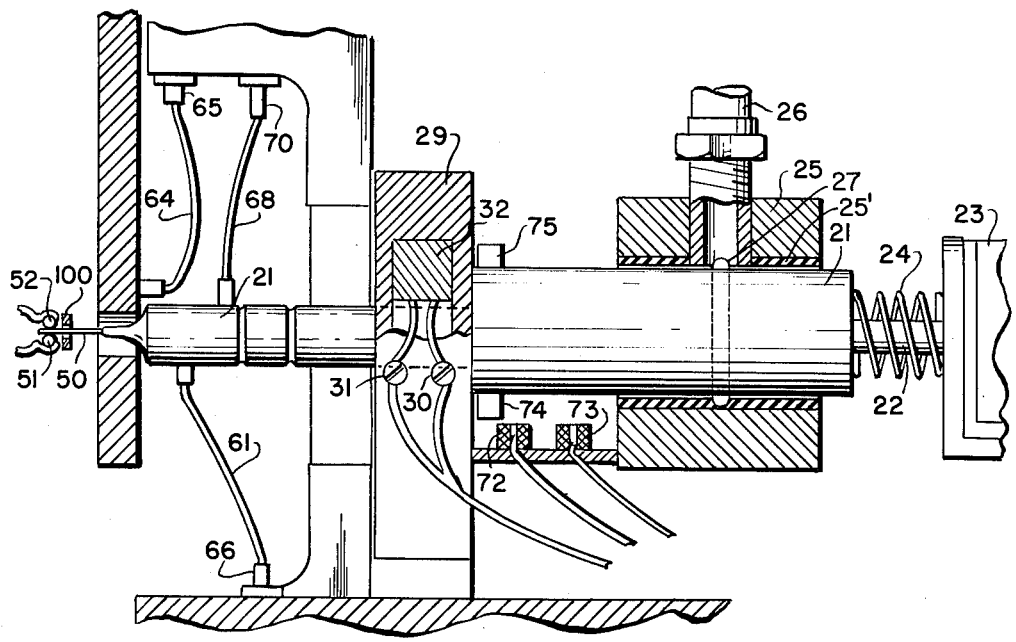
FIG. 8 is an enlarged detail view, partly in section of the probe mechanism.

Pulses to set up this timing operation are supplied by a unique method of generating pulses. Two small coils 72, 73 are mounted at one side of the probe armature (see FIG. 8). A small permanent magnet 74, which also serves as a mechanical guide is mounted on the armature 22. Movement of the armature 22 then generates a pulse in each coil 72, 73, the current in core 73 being used for "on" and the current in coil 72 being for "off" timing. These pulses being dependent on the probe operation, always assure proper timing of the contacts and damping magnet. A balancing magnetic slug 75 is fixed on probe armature 22 directly opposite the magnet 74.

Figure 9:
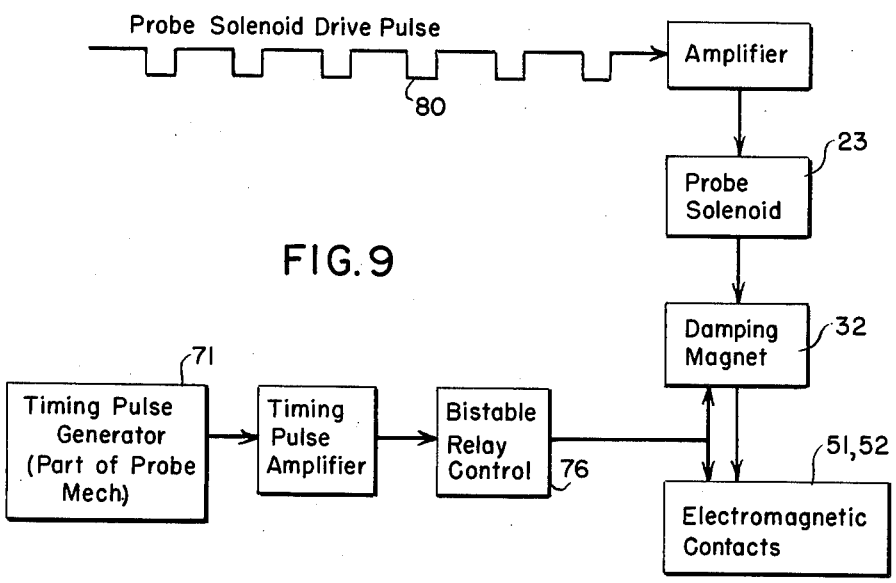
FIG. 9 is a block diagram of the electrical timing means for the device.

As indicated in FIG. 9, the coils 72, 73 control the timing through a bistable relay control device 76, the details of which are not shown. However, the familiar flip-flop circuit is an example of such a bistable control device. In such a circuit, for example, one portion thereof remains in the conductive state until a pulse from an external source produces a degree of instability which shifts the circuit to its other stable state. In this apparatus, the two coils 72 and 73 determine the stability of the bistable control means.

The electrical circuit for sorting of the cores is shown only diagrammatically in FIG. 10 since the circuit, per se, is not a part of the present invention. The accept drive pulse 78 is added to three separate coincident pulses 81, 82, 83 in the matrix 77 so that one of the switches 39, 40 or 41 is operated by the resultant pulse.

*The Operation of the Device*

In operation, a quantity of toroids 100 are placed in the bowl of a vibratory feeder 10. These toroids 100 are fed from this unit 10 standing on edge, their diameters touching. From the feeder the cores pass into the bridge 13 containing the groove or track 14 of proper size to allow free, on-edge passage. This bridge 13 spans the distance between the Syntron 10 and the stationary track assembly 17. It also provides a means by which vibration in the direction of core travel can be taken up without the usual gap between vibrating and stationary parts, thereby eliminating much core breakage.

From the bridge assembly 13 cores 100 enter the curved, gravity-fed, track 16 still standing on edge. Positioning is accomplished by means of the adjustable shuttle 101 which is mechanically linked to the probe holder 21 for correct timing.

After a core 100 has been tested it is released by the shuttle 101 and drops into a vacuum manifold containing four ports, three accept and one reject. Vacuum is supplied at one of the three accept ports depending on the magnetic characteristics of the core 100. After the core enters a given port it is deposited in a plastic bottle. If not acceptable it drops straight down into the fourth port which directs it into the reject receptacle.

Since the inside diameter of the toroid is relatively small it is necessary that the current carrying probe 50 be kept in absolute alignment at all times. This is made possible by a unique gas bushing in which the probe carrier shaft 22 is completely supported by air. Friction is virtually eliminated and positive alignment maintained. The bushing is constructed so as to allow air or gas at 15–20 p.s.i. and approximately 4 c.f.m. to escape axially around the periphery of the large diameter probe carrier shaft. The carrier is actuated at the rate of 12 cycles per second by a solenoid magnet 23.

Reverberation of the probe carrier shaft against its stop 29 is prevented by an electro magnetic damper 32 which is energized just before the probe carrier shaft 22 comes in contact with the stop 29. Testing time is gained since the probe is stationary for a longer period. Wear on the two metallic contacts 51, 52 which complete the electrical circuit for the probe upon passage through a core is also reduced. These contacts 51, 52 are electro magnetically operated and timed so they are always open when the probe is in motion. This is essential for a practical contact life expectancy.

The features and principles underlying the invention described above in connection with specific exemplifications will suggest to those skilled in the art many other modifications thereof. It is accordingly desired that the appended claims shall not be limited to any specific feature or details thereof.

We claim:

1. In a ferromagnetic core tester, means for feeding cores in succession to a predetermined aligned position for testing, means for passing a needle-shaped probe through said cores one at a time in succession, said last named means comprising a probe carrier, means for reciprocating said probe carrier axially with respect to the probe at a high rate of speed, means for mounting and centering the probe carrier for its axial movement comprising a bearing surrounding a portion of said probe carrier spaced from the probe, said bearing being spaced from the portion of the carrier it surrounds and means for introducing gas under pressure into the space between the bearing and the portion of the probe carrier it surrounds whereby the probe carrier is supported and centered by the pressure of said gas.

2. The core tester as claimed in claim 1, said means for feeding the cores to be tested comprising a vibrator feed device, a stationary gravity feed device for guiding the cores to the position to be tested and bridge means connecting the vibrator device to the gravity feed means, said bridge means and said stationary gravity feed device having matching grooves therein in which the cores are fed edgewise, said bridge means comprising a tongue element at the end thereof adjacent to the gravity feed device, said tongue element being solidly mounted to the end of said stationary gravity feed device whereby the vibrations of said vibrator feed and bridge device is not transmitted to said stationary gravity feed device.

3. The core tester as claimed in claim 1 comprising solenoid means surrounding a portion of said probe carrier to activate the same in at least one axial direction.

4. The core tester as claimed in claim 1 comprising solenoid means surrounding a portion of the probe carrier to activate the same in one axial direction and spring means to activate said probe carrier in the opposite axial direction.

5. The core tester as claimed in claim 1 comprising stop means adapted to limit the movement of the probe carrier in the axial direction in which the probe moves through the core, magnetic means affixed to said stop means, cooperating magnetic means on said probe carrier whereby bounce of the probe carrier is prevented when the latter meets the stop means.

6. The core tester as claimed in claim 5 in which the magnetic means affixed to said stop comprises an electromagnetic coil.

7. The core tester as claimed in claim 5 in which the cooperating magnetic means on the probe carrier comprises a permanent magnet.

8. The core tester as claimed in claim 5 in which the magnetic means affixed to said stop comprises an electromagnetic coil and means on said probe carrier to control the energizing of said electromagnetic coil.

9. The core tester as claimed in claim 1, a dual circuit probe carried by said probe carrier, said dual circuit probe comprising an outer hollow needle-like conductor, an inner conductor insulated from the hollow outer conductor, said outer hollow needle-like conductor having an opening in the side thereof adjacent the end thereof remote from the carrier, the insulating means of said inner conductor being removed adjacent said opening, a pair of contacts adapted to close on said probe after the latter moves through a core to be tested, the first of said pair of contacts making contact with the inner conductor through said side opening in the outer conductor and the second of said contacts making contact with the outer conductor, electrical connection to the end of said probe opposite the end containing the opening to complete a driving and a sensing circuit through the core to be tested.

10. The core tester is claimed in claim 9, comprising means to open said pair of contacts when the probe carrier is in motion.

11. The core tester as claimed in claim 9, comprising electromagnetic means to open said pair of contacts when the probe carrier is in motion.

12. The core tester as claimed in claim 9, comprising electromagnetic means to open said pair of contacts when the probe carrier is in motion, means on the probe carrier to control the operation of said electromagnetic means.

13. The core tester as claimed in claim 9, comprising stop means adapted to limit the movement of the probe carrier in its axial movement toward said pair of contacts, electromagnetic means affixed to said stop means, cooperating magnetic means on said probe carrier, means on the probe carrier adapted to control, by the movement of said probe carrier, the energizing of the electromagnetic means of said stop means and the energizing of the electromagnetic means of said pair of contacts whereby bounce of the probe carrier from the stop means, and rubbing contact of the probe with the pair of contacts is prevented.

14. A dual-circuit probe for testing small toroidal cores having an inside diameter of the order of .03″ by insertion therethrough comprising an outer, hollow, needle-like conductor, means holding the outer conductor at one end thereof for axial movement of the same through a core to be tested, the free end of said hollow needle-like conductor having a relatively large, converging, cut-away portion extending transversely across the outer conductor from one side thereof toward the diameter and overlapping a substantial proportion of the hollow interior of said outer conductor whereby to provide an opening into which a linear contact element of a length greater than the diameter of the outer conductor may be inserted with its length extending across said cut-away portion and intersect the hollow interior of the outer conductor, an inner conductor extending through said outer conductor from the attached end thereof to the side opening, means for insulating said inner conductor from the outer conductor, said inner conductor being exposed for contact at the side opening on said outer conductor.

15. A dual-circuit probe for testing cores as claimed in claim 14, comprising a pair of contacts adapted to grip the free end of said probe across the region containing said side opening, the first of said pair of contacts making contact with said inner conductor and the second of said pair of contacts making contact with said outer conductor, a first circuit connecting the first of said contacts with the end of said inner contact opposite said free end, and a second circuit connecting the second of said contacts with the end of the outer contact opposite the free end.

References Cited in the file of this patent

UNITED STATES PATENTS

| | | |
|---|---|---|
| 2,615,948 | Kamen | Oct. 28, 1952 |
| 2,694,182 | Edlen et al. | Nov. 9, 1954 |
| 2,706,282 | Dudra | Apr. 12, 1955 |
| 2,914,729 | Thompson et al. | Nov. 24, 1959 |
| 2,922,518 | Kristensen | Jan. 26, 1960 |